United States Patent
Hatayama et al.

(10) Patent No.: US 9,203,072 B2
(45) Date of Patent: Dec. 1, 2015

(54) MICROPOROUS POLYOLEFIN FILM AND SEPARATOR FOR STORAGE CELL

(75) Inventors: Hiroshi Hatayama, Moriyama (JP); Hiroshi Sogo, Moriyama (JP)

(73) Assignee: ASAHI KASEI CHEMICALS CORPORATION, Tokyo (JP)

( * ) Notice: Subject to any disclaimer, the term of this patent is extended or adjusted under 35 U.S.C. 154(b) by 1317 days.

(21) Appl. No.: 11/661,147

(22) PCT Filed: Aug. 29, 2005

(86) PCT No.: PCT/JP2005/015658
§ 371 (c)(1),
(2), (4) Date: Feb. 26, 2007

(87) PCT Pub. No.: WO2006/025323
PCT Pub. Date: Mar. 9, 2006

(65) Prior Publication Data
US 2008/0096102 A1    Apr. 24, 2008

(30) Foreign Application Priority Data
Aug. 30, 2004   (JP) .................................. 2004-250868

(51) Int. Cl.
| | |
|---|---|
| *H01M 2/14* | (2006.01) |
| *H01M 2/16* | (2006.01) |
| *C08J 5/18* | (2006.01) |
| *H01M 10/052* | (2010.01) |
| *H01M 10/42* | (2006.01) |

(52) U.S. Cl.
CPC ............... *H01M 2/1653* (2013.01); *C08J 5/18* (2013.01); *H01M 2/145* (2013.01); *H01M 2/1646* (2013.01); *C08J 2323/00* (2013.01); *H01M 10/052* (2013.01); *H01M 10/4235* (2013.01)

(58) Field of Classification Search
CPC ....................................................... H01M 2/14
USPC ....................................................... 429/122
See application file for complete search history.

(56) References Cited

U.S. PATENT DOCUMENTS

| | | | |
|---|---|---|---|
| 4,335,193 A | | 6/1982 | Doi et al. |
| 4,681,750 A | * | 7/1987 | Johnson et al. ............... 423/339 |
| 5,091,272 A | * | 2/1992 | Treger ............................. 429/62 |
| 6,096,213 A | | 8/2000 | Radovanovic et al. |
| 2002/0034689 A1 | | 3/2002 | Hoshida et al. |
| 2003/0168764 A1 | | 9/2003 | Nishida et al. |
| 2004/0115523 A1 | * | 6/2004 | Hommura et al. ............ 429/144 |
| 2004/0151985 A1 | * | 8/2004 | Munshi ......................... 429/309 |
| 2005/0019665 A1 | * | 1/2005 | Adachi et al. ................. 429/254 |
| 2005/0098913 A1 | * | 5/2005 | Funaoka et al. ................ 264/41 |

FOREIGN PATENT DOCUMENTS

| | | | |
|---|---|---|---|
| JP | 63-205332 | | 8/1988 |
| JP | 08-064194 | | 3/1996 |
| JP | 10-50287 | | 2/1998 |
| JP | 11-199692 | | 7/1999 |
| JP | 2000-256491 | | 9/2000 |
| JP | 2002-69221 | | 3/2002 |
| JP | 2002-105235 | | 4/2002 |
| JP | 2003-26847 | | 1/2003 |
| JP | 2003-82139 | | 3/2003 |
| JP | 2003-105120 | | 4/2003 |
| JP | 2003-231772 | | 8/2003 |
| JP | 2003-292665 | | 10/2003 |
| TW | 539705 | | 7/2003 |
| TW | 543120 | | 7/2003 |
| TW | 590887 | | 6/2004 |
| TW | 591067 | | 6/2004 |
| WO | WO 99/48959 | | 9/1999 |
| WO | WO 02/092677 | | 11/2002 |
| WO | WO 2004-020511 | * | 3/2004 |

OTHER PUBLICATIONS

European Search Report for Counterpart EP Application No. 05775109.1 dated Mar. 16, 2010.

* cited by examiner

*Primary Examiner* — Ula Ruddock
*Assistant Examiner* — Jacob Marks
(74) *Attorney, Agent, or Firm* — Finnegan, Henderson, Farabow, Garrett & Dunner, L.L.P.

(57) ABSTRACT

A microporous film, characterized in that it is prepared by a method comprising melting and kneading a polyolefin resin, inorganic particles and a plasticizer, forming the resultant mixture into a sheet, subjecting the rejecting the resultant sheet to a biaxial stretching treatment of a surface magnification of not less than 20 and less than 100 times, and then extracting the plasticizer, it has an inorganic particle content of 20 to 60 mass %, and it exhibits a piercing strength of 3.0 N/20 μm or more.

9 Claims, No Drawings

MICROPOROUS POLYOLEFIN FILM AND SEPARATOR FOR STORAGE CELL

TECHNICAL FIELD

The present invention relates to a microporous film high in safety and reliability, suitable for separators or the like for storage batteries, e.g., secondary cells of non-aqueous electrolyte solution, electric double-layer capacitors and so forth, and high in industrial productivity.

BACKGROUND ART

Microporous films have diversified pore diameters, pore shapes and pore numbers, and have found wide applications for their characteristics expressed by their peculiar structures. For example, they have been used as separation films for water treatment and enrichment because of their sieving effects by pore sizes; as adsorbent films for water absorption, oil absorption and deodorizing materials because of their large surface areas and pore spaces realized by microporosity; moisture-permeable, water-proof sheets because of their characteristics of permeating air or steam but not water; high-molecular-weight electrolyte membranes and humidification membranes useful for fuel cells and the like because of their multi-functions realized when they are filled with various materials in the pores; and liquid-crystal and cell materials.

Recently, the automotive industry, in particular, is positively studying introduction of pure electric vehicles (PEVs) and hybrid electric vehicles (HEVs), viewed from energy- and resources-saving due to heightened international activities for global environmental protection. As a result, fuel cells and large-size lithium-ion secondary cells have been actively developed as motor driving or auxiliary power sources. Moreover, electric double-layer capacitors are also greatly expected as HEV auxiliary power sources, because of their potential of charging and discharging large current in a very short time, and are being developed. Storage batteries such as lithium-ion secondary cells and electric double-layer capacitors are provided with a porous film, referred to as separator, containing an electrolyte solution between the positive and negative electrodes, because it prevents contact of these electrodes with each other and has a function of transmitting ions.

Lithium-ion secondary cells are required to be reliable and safe for extended periods, and their separators are required to impregnate and hold an electrolyte solution. Charging and discharging cycles are accompanied by expansion and contraction of the cell. Its separator, when compressed, discharges an electrolyte solution it holds, and depletion of the solution occurs, when the discharged solution is not returned back to the separator. This causes deterioration of cell performance, e.g., reduced cell capacity.

Large-size cells, in particular those for PEVs or HEVs, need much electrolyte solution charging time while they are being produced when their solution impregnating capability is insufficient, because of their large separator size. Moreover, they may encounter troubles which may deteriorate productivity or cell performance, e.g., deteriorated performance resulting from unevenly charged solution.

An electrode-active material may impale a separator, because its shape is not always smooth, to cause short-circuiting between the electrodes. Therefore, a separator is required to have a high piercing strength to prevent short-circuiting. Moreover, lithium-ion secondary cells or the like of high capacity and high output potentially generate excessive heat more frequently than conventional ones under abnormal conditions, e.g., short-circuiting and overcharging, because of larger energy quantity they contain. These cells, therefore, are provided with several measures to secure safety under abnormal conditions. One of the measures is a separator shut-down function. This function closes the separator pores, when cell temperature increases by some kind of causes, to prevent ion movement, terminates the cell reactions and thereby controls excessive heat generation. Porous polyethylene films have been extensively used for lithium cell separators, one of the reasons for which is their excellent shut-down functions. However, cells of higher energy, now under development, generate much larger quantities of heat under abnormal conditions, possibly increasing cell temperature to a high level in a short time or keeping them at high temperature for extended periods, because much time is needed for radiating the heat after the cells are shut down. Under these conditions, the separator may be contracted or broken to cause short-circuiting between the positive and negative electrodes to generate more heat.

Electric double-layer capacitors, on the other hand, are required to have higher capacity, and the separators therefor are required to be thinner. Cellulosic papers and glass fiber sheets, which have been widely used for separators, are difficult to be further thinner due to production difficulty and concerns about self-discharging. Microporous polyolefin films have been studied, because they can be potentially thinner and stronger than the conventional materials. However, they have not been commercialized for electric double-layer capacitors, because of their low electrolytic solution impregnating capability.

Studies have been extensively made to solve these problems, but have not always produced satisfactory results.

Patent Document 1, for example, discloses a porous film of polyolefin containing particles of inorganic compound, e.g., titanium oxide, aluminum oxide or potassium titanate, at 20 to 80% by mass, claiming that it can keep insulation capability even at high temperature by virtue of presence of the inorganic powder and has improved resistance to short-circuiting at high temperature. The method disclosed by the document, however, may give a film of insufficient shut-down function. Moreover, the microporous film produced by the method is limited in industrial productivity, high strength and thinness. In a conventional method, inorganic particles tend to agglomerate with each other while they are kneaded with a polyolefin resin and plasticizer. Therefore, it can reduce agglomerated particles to a limited extent. When a film not sufficiently free of agglomerated particles is stretched at a high magnification, the pore structure becomes coarse originating from the agglomerated particles, with the result that the film tends to be broken. Such a microporous film is not suited for industrial production and, at the same time, difficult to attain a high piercing strength. Moreover, in order to produce a thin film by stretching at a low magnification of 10 times or so, as disclosed by Patent Document 1, it is conceivably extruded from a die or the like with narrow dielip clearance. Decreasing the clearance, however, tends to cause troubles which can eventually break the film, e.g., deposition of resin, and formation of streaks and waves on the film.

Patent Document 2 discloses that a porous polyolefin film containing particles of silicon oxide, alumina or the like having an average diameter of 100 nm or less at a relatively low content of 1% by mass or more but less than 20% by mass can be stretched at a high magnification, and that it is resistant to short-circuiting at high temperature in spite of its high piercing strength and thinness. It also discusses that a microporous film will have a decreased strength and cause agglomeration of the inorganic particles when the inorganic particle content increases to 20% by mass or more. The porous film disclosed by Patent Document 2, however, may not exhibit sufficient capability of impregnating and retaining an electrolyte solution, because of its relatively low inorganic particle content. Moreover, it will have deteriorated shape retainability at high temperature of its melting point or higher, and is required to have still improved resistance to short-circuiting.

Patent Document 3 proposes a porous film containing a ultrahigh-molecular-weight polyolefin resin having a weight-average molecular weight of 500,000 or more, and particles having a diameter of 0.001 to 10 µm at 5 to 70% by mass. However, the porous film disclosed in the embodiment cannot have a high piercing strength, because of low magnification of 2 by 2 times at which it is stretched.

Patent Document 4 discloses a porous film composed of 30 to 85% by mass of polyolefin and 15 to 70% by mass of flat inorganic particles, where the polyolefin contains a ultrahigh-molecular-weight polyolefin having a weight-average molecular weight of 1,000,000 or more. Example 1 in the specification uses a ultrahigh-molecular-weight polyolefin having a weight-average molecular weight of 2,000,000 and a combination of rolling and biaxial stretching to achieve a high strength at an overall magnification of 75 times. However, the rolling presses the film by a planar press and does not hold the film in the biaxial directions, and increases film strength to a limited extent, because of orientation relaxing proceeding simultaneously. Moreover, the rolling at a high magnification is difficult to apply to continuous production, and unsuitable for industrial production. Still more, the rolling of the film containing a ultrahigh-molecular-weight polyolefin having a weight-average molecular weight of 1,000,000 may cause problems which lead to failure of complete shut-down, because of increased shut-down temperature and insufficient resistance increase. A film containing inorganic particles and a ultrahigh-molecular-weight polyolefin having a weight-average molecular weight of 1,000,000 or more tends to greatly increase film melt viscosity and shutdown temperature. Moreover, the film may have still increased shut-down temperature when rolled, because of progress of orientation relaxing.

Patent Document 5 discloses a porous film containing a filler of calcium carbonate, barium sulfate or the like, high-density polyethylene and low-molecular-weight compound, and stretched at a magnification of 3 times or more in each of the lengthwise and crosswise directions. It realizes a high magnification by incorporating the low-molecular-weight compound at 0.5 to 10 parts by mass per 100 parts by mass of the high-density polyethylene. However, the method disclosed by Patent Document 5 is essentially based on boundary separation to produce the porous film, and produces a film of increased porosity because of contamination with air. As a result, it has a limited capability for producing a thin film of high piercing strength.

Patent Document 1: JP-A-10-50287
Patent Document 2: JP-A-2003-292665
Patent Document 3: JP-A-2003-26847
Patent Document 4: JP-A-2000-256491
Patent Document 5: JP-A-2003-82139

DISCLOSURE OF THE INVENTION

The present invention provides a thin microporous film of high strength, excellent in capability of impregnating and retaining an electrolyte solution and having good shut-down capability and resistance to short-circuiting, suitable for separators or the like for storage batteries, e.g., secondary cells of non-aqueous electrolyte solution, electric double-layer capacitors and so forth, which are required to be highly reliable and safe, and also excellent in industrial productivity.

The present inventors have found, after having extensively studied to solve the above problems, that a microporous film produced by melting and kneading a polyolefin resin, inorganic particles and plasticizer and forming the resulting mixture into a sheet shape, which is then biaxially stretched at a surface magnification of 20 times or more but less than 100 times and treated to extract the plasticizer, characterized by containing the inorganic particles in an amount of 20% by mass or more and 60% by mass or less, inclusive and having a piercing strength of 3.0 N/20 µm or more, is a thin film of high strength, excellent in capability of impregnating and retaining an electrolyte solution and having good shut-down capability and resistance to short-circuiting, and suitable for separators or the like for storage batteries, e.g., secondary cells of non-aqueous electrolyte solution, electric double-layer capacitors and so forth, which are required to be highly reliable and safe, achieving the present invention.

The present invention has the following aspects:
1. A microporous film produced by melting and kneading a polyolefin resin, inorganic particles and a plasticizer and forming a resulting mixture into a sheet shape, then biaxially stretching the sheet at a surface magnification of 20 times or more but less than 100 times, and extracting the plasticizer from the sheet, wherein the content of the inorganic particles is 20% by mass or more and 60% by mass or less, and the piercing strength of the microporous film is 3.0 N/20 µm or more.
2. The microporous film of the aspect 1, wherein the inorganic particles have a plasticizer oil absorption of 150 mL/100 g or more and 500 mL/100 g or less.
3. The microporous film of the aspect 1 or 2 which is produced by the step of kneading the polyolefin resin, the inorganic particles and the plasticizer in a composition range which satisfies the following relationship:

$$0.6 \leq \text{a weight of plasticizer}/(\text{plasticizer oil absorption} \times \text{a weight of inorganic particles} \times \text{plasticizer density}) \times 100 \leq 1.2 \quad (1).$$

4. The microporous film of one of the aspect 1 to 3, wherein the polyolefin resin has a viscosity-average molecular weight of 50,000 or more but less than 2,000,000.
5. The microporous film of one of the aspects 1 to 3, wherein the polyolefin resin has a viscosity-average molecular weight of 50,000 or more but less than 1,000,000.
6. The microporous film of one of the aspects 1 to 5, which has a shut-down temperature of 150° C. or lower.
7. A separator for storage battery comprising the microporous film of one of the aspects 1 to 6.
8. A method for producing the microporous film of one of the aspects 1 to 6.

The microporous film of the present invention has fine pores and good permeability; is a thin film of high strength; is excellent in capability of impregnating and retaining an electrolyte solution; and is excellent in shape retainability at high temperature. It is in particular excellent in capability of impregnating and retaining a non-aqueous electrolyte solution; simultaneously exhibits shut-down capability and resistance to short-circuiting; is particularly suitable for separators or the like for storage batteries, e.g., secondary cells of non-aqueous electrolyte solution, electric double-layer capacitors and so forth, which are required to be highly reliable and safe; and is excellent in industrial productivity.

BEST MODE FOR CARRYING OUT THE INVENTION

The microporous film of the present invention is described, in particular centered by its preferred embodiments.

The polyolefin resin for the present invention is that to be molded by a conventional method, e.g., extrusion, injection, inflation or blow molding. Examples of the resin include homopolymers of ethylene, propylene, 1-butene, 4-methyl-1-pentene, 1-hexene or 1-octene; copolymers; and those produced by multi-stage polymerization. They may be used either individually or in combination. Representative examples of these polymers include low-density polyethylene, linear low-density polyethylene, intermediate-density polyethylene, high-density polyethylene, ultrahigh-molecular-weight polyethylene, isotactic polypropylene, atactic polypropylene, polybutene, ethylene/propylene rubber. A resin containing a high-density polyethylene as a main component is particularly preferable for the microporous film of the present invention for cell separators, because of its low melting point and high strength to satisfy the requirements of cell separators.

The polyolefin resin for the present invention and microporous film of the present invention preferably have a viscosity-average molecular weight of 50,000 or more but less than 12,000,000, more preferably 50,000 or more but less than 2,000,000, still more preferably 50,000 or more but less than 1,000,000, most preferably 100,000 or more but less than 500,000. Those having a viscosity-average molecular weight of 50,000 or more have a high melt tension during melt molding process and hence improved moldability, and, at the same time, tend to have the high-molecular-weight chains well entwined each other to increase film strength. Those having a viscosity-average molecular weight less than 12,000,000 tend be well molten and kneaded with the other components to give high sheet moldability, in particular thickness stability. Moreover, those having a viscosity-average molecular weight less than 1,000,000 have a low melt viscosity in spite of high inorganic particle content in an amount of 20% by mass or more and 60% by mass or less, and, when used for cell separators, easily close film pores at high temperature to provide a film with good shut-down function. The polyolefin may be a mixture of a polyethylene having a viscosity-average molecular weight of 2,000,000 and polyethylene having a viscosity-average molecular weight of 270,000, mixed to have an overall viscosity-average molecular weight less than 1,000,000, instead of a single component of polyolefin having a viscosity-average molecular weight less than 1,000,000.

The polyolefin resin for the present invention may be incorporated, as required, with an additive within limits not harmful to the advantages of the present invention. The useful additives include an oxidation inhibitor, e.g., phenol-, phosphorus- or sulfur-based one, metallic soap, e.g., one based on calcium stearate or zinc stearate, UV absorber, light stabilizer, antistatic agent, anti-fogging agent, and colorant and pigment.

The plasticizer useful for the present invention is not limited, so long as it is an involatile solvent which can uniformly dissolve the polyolefin resin at its melting point or higher. The useful plasticizers include hydrocarbons, e.g., liquid paraffin and paraffin wax; esters, e.g., dioctyl phthalate and dibutyl phthalate; and higher alcohols, e.g., oleyl alcohol and stearyl alcohol. With polyethylene as the polyolefin resin, liquid paraffin is a preferable plasticizer, because it is highly compatible with polyethylene to prevent boundary separation between the resin and the plasticizer when it is stretching and hence easily allows for uniform stretching.

The inorganic particles for the present invention preferably have an oil absorption of 150 mL/100 g or more for a plasticizer used, more preferably 150 mL/100 g or more and 1,000 mL/100 g or less, still more preferably 150 mL/100 g or more and 500 mL/100 g or less. The composition for the present invention, containing inorganic particles at 20% by mass or more and a plasticizer at a high content, can be stretched at a high magnification to give a thin film of high strength, when the oil absorption is 150 mL/100 g or more, because the polyolefin resin, inorganic particles and plasticizer can be molten and kneaded and extruded into a sheet shape in which agglomeration of the particles is well controlled. The microporous film, when used for non-aqueous storage battery separators, can be expected to secure high cell productivity and performance maintenance for extended periods, because of its excellent capability for impregnating and retaining the non-aqueous electrolytic solution. At an oil absorption of 1000 mL/100 g or less, on the other hand, the particles have a high bulk density and are easily handled in the production line.

The inorganic particles for the present invention preferably have the primary particles substantially free of internal surface area, or in other words the primary particles substantially free of fine pores. These inorganic particles will give a microporous film which tends to keep capacity when used for non-aqueous electrolyte type cell separators. This advantage conceivably results from prevented capacity deterioration caused by contamination with water, because adsorbed water can be easily removed by a common drying method in the substantially absence of fine pores in the primary particles, although the phenomena involved are not fully substantiated. The particle shape is preferably spherical rather than layered for the same reason. These inorganic particles can be produced by a vapor-phase process, e.g., that aided by a chemical flame or plasma. For example, silicon tetrachloride or titanium tetrachloride can be reacted (combusted) in the presence of oxygen and hydrogen or the like to produce the silicon oxide or titanium oxide particles substantially free of pores inside. The solid-phase process (e.g., combustion synthesis) and liquid-phase process (e.g., precipitation) tend to give inorganic particles or natural mineral having a structure of fine pores or layered structure in the primary particles. Internal surface area can be determined, or presence or absence of internal fine pores can be confirmed, by pore size distribution measured by gas adsorption or comparing specific surface areas of molecules of different size. More specifically, the inorganic particles for the present invention are preferably of an oxide or nitride of silicon, aluminum or titanium. More preferably, they are treated to have hydrophobic surface, viewed from dispersibility of polyolefin in a plasticizer and removal of moisture.

The microporous film of the present invention shall contain inorganic particles in an amount of 20% by mass or more and 60% by mass or less, preferably 20% by mass or more and 50% by mass or less, inclusive. The film containing inorganic particles at 20% by mass or more is compatible with an electrolyte solution to exhibit excellent solution impregnating and retaining capability. At 60% by mass or less, on the other hand, the film not only exhibits excellent solution impregnating and retaining capability but also gives a sheet having a high strength, stretchable at a high magnification and having a high piercing strength.

Electrolyte solution impregnating capability can be easily confirmed. An electrolyte solution is dropped onto the microporous film surface, and time taken by the solution to become transparent on most of the film surface in contact with the droplets as the solution penetrates into the film is compared with that of the reference case, where most of the surface means about 80% or more of the area in contact with the droplets. With a 1 mol/L propylene carbonate solution of tetraethyl ammonium tetrafluoroborate, for example, the time taken by the solution to become transparent is preferably as short as possible. More specifically, it is preferably 30 seconds or less, more preferably 20 seconds or less, still more preferably 10 seconds or less.

The microporous film containing a polyolefin having a viscosity-average molecular weight less than 1,000,000 can exhibit good shut-down performance, when inorganic particle content is 60% by mass or less. A good shut-down performance means shut-down temperature of 150° C. or lower, for example.

The microporous film of the present invention is low in contraction, excellent in resistance to breaking, capable of keeping the positive and negative electrodes insulated from each other even at a high temperature of melting point of the polyolefin resin it contains or higher, and high in resistance to short-circuiting at high temperature because of the presence of inorganic particles.

Moreover, the microporous film is excellent in resistance to compression in the in-plane directions, and also in reliability for extended periods even when used for lithium-ion cell separators with a negative electrode of high thermal expansion coefficient, e.g., tin- or silicon-based one, also because of the presence of inorganic particles.

The polyolefin resin/inorganic particles/plasticizer ratio for the present invention is not limited, so long as it is sufficient to allow these components to be uniformly molten and kneaded to give a sheet-shape microporous film precursor while preventing deteriorated productivity. More specifically, the composition of polyolefin resin, inorganic particles and plasticizer contains a plasticizer preferably at 30 to 80% by mass, more preferably 40 to 70% by mass. At a plasticizer content of 80% by mass or less, the microporous film tends to have improved moldability, because shortage of melt tension is controlled during the melt molding step. At 30% by mass or more, on the other hand, thickness of the film decreases as stretching magnification increases, to produce a thinner film. At the same time, the lamellar crystals of folded structure can be efficiently stretched because of the sufficient plasticizing effect. Stretching at a high magnification tends to give the film of uniformly fine structure and high strength without breaking the polyolefin chains. Moreover, extrusion load can be reduced to improve productivity.

For melting/kneading a polyolefin resin, inorganic particles and plasticizer, it is preferable that the polyolefin resin and inorganic particles are treated by a resin kneading machine, e.g., extruder or kneader, into which a plasticizer is thrown at a desired rate while the resin is molten under heating, which is composed of the resin, the inorganic particles and the plasticizer and the resulting composition is further kneaded to produce a uniform solution. It is more preferable that a given composition of polyolefin resin, inorganic particles and plasticizer is preliminarily kneaded by a Henschel mixer or the like, and then charged to an extruder, into which an optional quantity of the plasticizer is further thrown while the resin is molten under heating and further kneaded. Specifically, a mixture of a polyolefin resin, inorganic particles and a plasticizer in a range designated below, which has been preliminarily kneaded by a Henschel mixer or the like, is charged to a biaxial extruder. Moreover, the remainder of a given amount of the plasticizer is further added to the biaxial extruder as a side feed. Then, a sheet having the inorganic particles better dispersed therein, and stretching at a high ratio can be carried out without breaking the film.

Specifically, the polyolefin resin and the inorganic particles and the plasticizer are preliminarily kneaded so that a composition range may satisfy the following relationship (1):

$$0.6 \leq \text{a weight of plasticizer}/(\text{plasticizer oil absorption} \times \text{a weight of inorganic particles} \times \text{plasticizer density}) \times 100 \leq 1.2 \quad (1)$$

The plasticizer, when incorporated at a composition rate of 0.6 or more given by the above relationship (1), is adequately retained by the inorganic particles, and allows them to be uniformly dispersed, because of reduced differential bulk density between them and the polyolefin resin. At a composition rate of 1.2 or less, on the other hand, agglomeration of the inorganic particles is prevented, because they are present in a large quantity of the plasticizer. The rate is more preferably in a range from 0.7 to 1.0, inclusive. The final kneaded composition satisfying the above relationship can give the sheet with the inorganic particles and plasticizer well-dispersed in the resin, and hence the composition of polyolefin resin, inorganic particles and plasticizer may be kneaded by an extruder or the like at one time.

The above molten and kneaded composition is then molded into a sheet shape by extrusion and then cooled and solidified into a sheet-shape microporous film precursor. It is preferable that a uniform solution of polyolefin resin, inorganic particles and plasticizer is extruded through T-dies or the like into a sheet shape, and brought into contact with a thermal conductor to be cooled to a temperature sufficiently lower than resin crystallization temperature. The thermal conductor for cooling and solidification may be selected from a metal, water, air or plasticizer itself. A method for cooling the sheet by contact with a metal roll is particularly preferable because of high efficiency of thermal conduction. More preferably, the sheet shape is placed between rolls, because it can be cooled at a still higher thermal conduction efficiency, oriented to have increased strength and have the surface of higher flatness and smoothness. The dielip clearance for extrusion of the sheet shape through T-dies is preferably 400 to 3000 μm, inclusive, more preferably 500 to 2500 μm, inclusive. The clearance of 400 μm or more reduces troubles, e.g., deposition of resin, has limited adverse effects on film quality, e.g., formation of streaks and other defects, and prevents film breaking in the subsequent stretching step. The clearance of 3000 μm or less, on the other hand, increases cooling rate, prevents cooling-caused unevenness and keeps thickness stability.

The sheet is biaxially stretched. Stretching the sheet in the biaxial directions at a high magnification gives a stable structure resistant to rupture, because the molecules are oriented two-dimensionally, and improves sheet piercing strength. The stretching method may be selected from simultaneous biaxial stretching, consecutive biaxial stretching, multi-stage stretching, stretching two or more times and so forth. They may be used individually or in combination. Simultaneous biaxial stretching is most preferable for improved film piercing strength, stretching uniformity and shut-down capability. It stretches the sheet simultaneously in the MD and TD directions at the same or different deformation rate in these directions. Consecutive biaxial stretching stretches the sheet in the MD and TD directions separately, where the sheet is unrestricted or kept at a constant length in one direction while being stretched in the other direction. Stretching magnification is preferably in a range from 20 times or more but less than 100 times in terms of surface magnification, more preferably 25 to 50 times, inclusive. It is preferably 4 to 10 times, inclusive in each direction, more preferably 5 to 8 times, inclusive. At an overall surface magnification of 20 times or more, the film can have a sufficient strength. At a stretching magnification of 100 times or less, the film can have sufficient resistance to breaking and hence can be produced at a high productivity. The rolling step may be combined with the biaxial stretching step, so long as film shut-down capability is not deteriorated. Rolling may be carried out by a press, e.g., double-belt press. It can improve, in particular, surface orientation. Surface magnification by rolling is preferably in a range from 1.01 to 3 times, inclusive, more preferably 1.01 to 2 times, inclusive. At a magnification of 1.01 times or more, surface orientation and film strength improve. A magnification of 3 times or less is also preferable for production of a porous structure uniform throughout the film by stretching, because differential between orientations of the film surface and center is reduced. The above area rolling ratio is also preferable viewed from production on a commercial scale.

Extraction of the plasticizer may be carried out either batchwise or continuously. In any case, it is preferable that the microporous film is dipped in an extractant to extract the plasticizer and then sufficiently dried, to substantially remove the plasticizer. It is a preferable procedure to restrict the microporous film at the ends during a series of dipping and drying steps to prevent film contraction. The extraction-treated microfilm contains the residual plasticizer at below 1% by mass.

Preferably, the extractant is is a poor solvent for the polyolefin resin and inorganic particles, good solvent for the plasticizer, and has a boiling point lower than the melting point of the microporous polyolefin film. The useful extractants include hydrocarbons, e.g., n-hexane and cyclohexane; halogenated hydrocarbons, e.g., methylene chloride and 1,1,1-trichloroethane; solvents halogenated with a halogen other than chlorine, e.g., hydrofuluoroether and hydrofluorocarbon; alcohols, e.g., ethanol and isopropanol; ethers, e.g., diethyl ether and tetrahydrofuran; and ketones, e.g., acetone and methylethylketone.

It is preferable that the stretching or extraction step is followed by heat treatment, e.g., thermal fixation or thermal relaxation, viewed from further prevention of microporous film contraction, within limits not harmful to the advantages of the present invention.

A post-treatment step may be adopted within limits not harmful to the advantages of the present invention. The useful post-treatments include hydrophilization with surfactant or the like cross-linking or the like with ionizing radioactive ray or the like.

The microporous film of the present invention preferably has a final thickness of 2 to 40 μm, inclusive, more preferably 5 to 40 μm, inclusive, still more preferably 5 to 35 μm, inclusive. It has a sufficient mechanical strength when it is 2 μm thick or more, and tends to be advantageous viewed from high cell capacity when it is 40 μm thick, because of reduced separator volumetric ratio.

Film porosity is preferably 25 to 70%, inclusive, more preferably 30 to 60%, inclusive. At 25% or more, it has a permeability not rapidly decreasing as porosity decreases. At 70% or less, on the other hand, it is kept reliable when used for cell separators, because of reduced possibility of self-discharging.

It has an air permeability of 10 to 1000 seconds, inclusive, more preferably 50 to 500 seconds, inclusive. At a permeability of 10 seconds or more, it has reduced self-discharging possibility when used for cell separators. At 1000 seconds or less, it can secure good charging and discharging characteristics.

The microporous film of the present invention has a piercing strength of 3.0 N/20 μm or more. Breaking of the film by an active material or the like dropped off while it is being wound in the cell production line is prevented when it has a piercing strength in the above range. Moreover, it has a reduced possibility of short-circuiting which may be caused by electrode expansion and contraction accompanying cell charging and discharging cycles. The piercing strength is preferably in a range from 4.0 to 20.0 N/20 μm, inclusive, more preferably 5.0 to 10.0 N/20 μm, inclusive. The microporous film having a piercing strength of 20.0 N/20 μm or less has a reduced width contraction possibility under heating.

Shut-down temperature of the microporous film is 120 to 160° C., inclusive, preferably 120 to 150° C., inclusive. The film having a shut-down temperature of 160° C. or lower tends to have improved safety-related performance, because current cutoff can be quickly accelerated when the cell in which the film is used generates excessive heat. On the other hand, the film having a shut-down temperature of 120° C. or higher can be serviceable or heat-treated at a high temperature around 100° C.

Short-circuiting temperature is preferably 180° C. or higher, more preferably 200° C. or higher. The film having a short-circuiting temperature of 180° C. or higher tends to prevent contact between the positive and negative electrodes when the battery in which the film is used generates excessive heat until the heat is released.

Diameter of the pores in the microporous film is preferably in a range from 0.01 to 5 μm, inclusive, more preferably 0.01 to 1 μm, inclusive. The film has a good permeability when the pore diameter is 0.01 μm or more, and adversely affected by troubles, e.g., clogging, to a lesser extent. When the pore diameter is 5 μm or less, on the other hand, the film is reliable when it is used for a separator of the battery because of reduced possibility of self-discharging.

Moreover, the film has a pore size ratio, given by surface pore diameter/cross-section pore diameter, in a range from 0.2 to 2.0, inclusive. The film having the ratio in the above range is well-balanced between permeability and self-discharging, and suitable for cell separators. The surface and cross-section pore diameters can be confirmed by scanning electron microscopy.

EXAMPLES

Next, the present invention is described in more detail by EXAMPLES, which by no means limit scope of the present invention. The following testing methods were used in EXAMPLES.
<Evaluation of Microporous Film>
(1) Film Thickness Film thickness was measured by a dial gauge (PEACOCK No. 25®, Ozaki Mfg.) for a 10 mm (MD direction) by 10 mm (TD direction) microporous film sample at a total of 9 points (3 by 3) in a grid pattern. The averaged film thickness (μm) is reported.
(2) Porosity A 10 by 10 cm square microporous film sample was measured for its volume ($cm^3$) and mass (g), and its porosity was determined by the following formula using a film density ($g/cm^3$):

Porosity (%)=(volume−mass/density of the mixed composition)/volume×100

Density of the mixed composition was found from densities of a polyolefin resin and inorganic particles, and mixing ratio.
(3) Air Permeability Air permeability was determined by a Gurley air permeability meter (Toyo Seiki) in accordance with JIS P-8117.
(4) Piercing Strength The piercing test was carried out using a handy compression tester (KES-G5®, Kato Tech) under conditions of needle tip radius: 0.5 mm and piercing rate: 2 mm/second, and the maximum piercing load is reported as a piercing strength (N).
(5) Oil Absorption Oil absorption was measured by an oil absorption meter (FRONTEX S410®, FRONTEX), where a plasticizer was dropped onto 5 g of inorganic particles while they were kneaded, and torque was monitored. It increased and then decreased. Quantity of the plasticizer (mL) when the torque decreased to 70% of the maximum level was found. Oil absorption was determined by the following formula using the above level and inorganic particle mass (g):

Plasticizer oil absorption (mL/100 g)=Quantity of plasticizer/a weight of inorganic particles×100

(6) Viscosity-Average Molecular Weight (Mv)

A solvent for a sample was prepared by dissolving 2,6-di-t-butyl-4-methylphenol as an aging inhibitor to 0.1% by mass in decahydronaphthalene, the resulting solution referred to as DHN.

A sample solution was prepared by dissolving a sample to 0.1% by mass in DHN at 150° C. Then, 10 mL of the sample solution was tested by a Canon Fenske viscometer (SO100) at 135° C., to measure time (t, seconds) taken by the solution to travel the distance between the marked lines. For a microporous film containing inorganic particles, the DHN solution was filtered to remove the particles before it was tested. Moreover, 10 mL of the DHN solution heated to 150° C. was tested in the same manner by the viscometer to measure time (tB, seconds) taken by the solution to travel the distance between the marked lines. Limiting viscosity [η] of the solution was determined by the following formula using the t and tB values:

$$[\eta]=((1.651 t/t_B-0.651)^{0.5}-1)/0.0834$$

Then, Mv is determined by the following formula using the [η] value:

$$[\eta]=6.77\times 10^{-4} Mv^{0.67}$$

(7) Electrolyte Solution Impregnating Capability

A 1 mol/L solution of tetraethyl ammonium tetrafluoroborate (solvent: propylene carbonate) was used as an electrolyte solution. It was dropped onto a microporous film in a globe box. The film was judged to have good electrolyte solution impregnating capability and marked with ○, when the solution became transparent on 80% or more of the area in contact with the solution in 30 seconds. If not, the film was judged to have insufficient impregnating capability and marked with x.
(8) Shut-Down Temperature and Short-Circuiting Temperature
a. Positive Electrode A composition containing lithium cobalt complex oxide ($LiCoO_2$) as a positive electrode active material at 92.2% by mass, flaky graphite and acetylene black as electroconductors each at 2.3% by mass and polyvinylidene fluoride (PVDF) as a binder at 3.2% by mass was dispersed in N-methylpyrrolidone (NMP) to prepare a slurry. The slurry was spread on one side of a 20 μm thick aluminum foil as a positive electrode current collector by a die coater to 250 g/m², dried at 130° C. for 3 minutes, and compression-molded by a roll press. Bulk density of the positive electrode active material was set at 3.00 g/cm³.
b. Preparation of Negative Electrode A composition containing synthetic graphite as a negative electrode active material at 96.6% by mass, and an ammonium salt of carboxylmethyl cellulose and styrene/butadiene copolymer latex as binders at 1.4 and 1.7% by mass was dispersed in refined water to prepare a slurry. The slurry was spread on one side of a 12 μm thick copper foil as a negative electrode current collector by a die coater to 106 g/m², dried at 120° C. for 3 minutes, and compression-molded by a roll press. Bulk density of the negative electrode active material was set at 1.35 g/cm³.
c. Non-Aqueous Electrolyte Solution $LiBF_4$ as a solute was dissolved to a concentration of 1.0 mol/L in a mixed solvent of propylene carbonate, ethylene carbonate and gamma-butyllactone (1/1/2 by volume) to prepare a solution.
d. Evaluation A ceramic plate equipped with thermocouples was coated with the negative electrode (65 by 20 mm) after it was dipped in the non-aqueous electrolyte solution for 1 minute or more, 9 μm thick Aramid film (50 by 50 mm, with a 16 mm-diameter hole at the center), microporous film sample (40 by 40 mm) after it was dipped in the non-aqueous electrolyte solution for 1 hour or more to cover the Aramid hole, positive electrode (65 by 20 mm) after it was dipped in the non-aqueous electrolyte solution for 1 minute or more in such a way not to come into contact with the negative electrode, captone film and about 4 mm thick silicon rubber.

The resulting laminate was set on a hot plate, and heated at 15° C./minute while it was pressed by a hydraulic press at 4.1 MPa, to measure changed impedance between the positive and negative electrodes under conditions of AC voltage of 1 V, 1 kHz and temperature up to 200° C. Temperature at which impedance reached 1000Ω was reported as shutdown temperature, and temperature at which impedance decreased again to 1000Ω after the pores were clogged was reported as short-circuiting temperature.

Example 1

A composition containing a high-density polyethylene (viscosity-average molecular weight Mv: 270,000) at 30 parts, silica (plasticizer oil absorption: 200 mL/100 g) at 20 parts, liquid paraffin (LP) as a plasticizer at 30 parts and pentaerythrityl-tetrakis-[3-(3,5-di-t-butyl-4-hydroxyphenyl) propionate as an oxidation inhibitor at 0.3 parts, all parts by mass, was treated under heating by a plastomill (Toyo Seiki) for mixing under conditions of plastomill temperature: 200° C., rotation speed: 50 rpm and 5 minutes. The molten mixture was further incorporated with 20 parts by mass of liquid paraffin, and treated under the same conditions for 5 minutes. The molten mixture was taken out of the plastomill and cooled. The resulting solid was placed between metallic plates via polyimide films, compressed at 10 MPa by a hot press set at 200° C. to form a 1000 μm thick sheet. The sheet was stretched by a simultaneous biaxial stretching machine (Iwamoto Seisakusho) at 123° C. and at a stretching magnification of 7 times in each of the MD and TD directions. It was dipped in methylene chloride to remove the plasticizer while it was held all around by a stainless steel frame, and dried at room temperature to prepare a microporous film. It had a film thickness of 20 μm, porosity of 50%, air permeability of 200 seconds, piercing strength of 5.0 N and shut-down temperature of 135° C. In the microporous film, no short-circuiting was observed even at 200° C., and electrolyte solution capability was rated good (marked with ○). The preliminary kneaded composition value given by the relationship (1) was 0.9 {=30/(200×20×0.868)×100)}. The film-making conditions and film characteristics are given in Table 1.

Example 2

A microporous film was prepared in the same manner as in EXAMPLE 1, except that the high-density polyethylene, silica and liquid paraffin were incorporated at 37.5 parts, 12.5 parts, and 20 parts before and 30 parts after, all parts by mass, and stretching was carried out at 120° C., replacing the corresponding conditions. The film-making conditions and film characteristics are given in Table 1.

Example 3

A microporous film was prepared in the same manner as in EXAMPLE 2, except that a sheet having a thickness of 600 μm before stretching was used and magnification was set at 5.5 times in each of the MD and TD directions, replacing the corresponding conditions. The film-making conditions and film characteristics are given in Table 1.

Example 4

A microporous film was prepared in the same manner as in EXAMPLE 2, except that silica having a plasticizer oil absorption of 230 mL/100 g and dioctyl phthalate (DOP) were used as plasticizers, replacing the corresponding conditions. The film-making conditions and film characteristics are given in Table 1.

Example 5

A microporous film was prepared in the same manner as in EXAMPLE 1, except that alumina having a plasticizer oil absorption of 180 mL/100 g was, and that the amount of the liquid paraffin incorporated earlier was changed to 20 parts by mass from 30 parts by mass and the amount of the liquid paraffin incorporated later was changed to 40 parts by mass from 20 parts by mass. The film-making conditions and film characteristics are given in Table 1.

Example 6

A composition containing a high-density polyethylene (Mv: 270,000) at 30 parts, silica (plasticizer oil absorption: 200 mL/100 g) at 20 parts, liquid paraffin (LP) as a plasticizer at 30 parts and pentaerythrityl-tetrakis-[3-(3,5-di-t-butyl-4-hydroxyphenyl)propionate as an oxidation inhibitor at 0.3 parts, all parts by mass, was treated by a Henschel mixer for preliminary mixing. The resulting mixture was charged by a feeder to a feed port of biaxial extruder with screws rotating in the same direction. Liquid paraffin was additionally charged as a side feed to a total quantity of 50 parts by mass per 100 parts by mass of the total mixture discharged from the extruder where it was molten and kneaded. The melting and kneading conditions were set temperature: 200° C., screw rotating speed: 180 rpm and mixture discharge rate: 12 kg/hour. Then, the molten and kneaded mixture was extruded through T-dies into a gap between the cooling rolls with surfaces controlled at 25° C., to prepare a 1000 μm thick sheet of the polyolefin composition. It was continuously charged to a simultaneous biaxial tenter set at 123° C. where it was treated by simultaneous biaxial stretching at a magnification of 7 times in each of the MD and TD directions. It was charged to a methylethylketone tank, where it was sufficiently dipped in methylethylketone to remove liquid paraffin by extraction. Then, methylethylketone was dried. The treated sheet was charged to a lateral tenter for thermal fixation and then wound. The lateral tenter was set at 135° C. The film-making conditions and film characteristics are given in Table 1.

Example 7

A microporous film was prepared in the same manner as in EXAMPLE 6, except that thickness of the polyolefin composition sheet was set at 500 μm and the lateral tenter was set at 137° C. for thermal fixation, replacing the corresponding conditions. The film-making conditions and film characteristics are given in Table 1.

Example 8

A microporous film was prepared in the same manner as in EXAMPLE 1, except that a high-density polyethylene (viscosity-average molecular weight Mv: 2,000,000) and high-density polyethylene (viscosity-average molecular weight Mv: 120,000) were incorporated at 9 and 21 parts by mass, replacing the corresponding conditions. The film-making conditions and film characteristics are given in Table 1.

Example 9

A microporous film was prepared in the same manner as in EXAMPLE 8, except that alumina having a plasticizer oil absorption of 180 mL/100 g was used in place of the silica, and liquid paraffin was incorporated at 20 parts by mass before and 40 parts by mass after, replacing the corresponding conditions. The film-making conditions and film characteristics are given in Table 1.

Example 10

A composition containing a high-density polyethylene (Mv: 2,000,000) at 12 parts, high-density polyethylene (Mv: 270,000) at 18 parts, silica (plasticizer oil absorption: 200 mL/100 g) at 10 parts, liquid paraffin (LP) as a plasticizer at 15 parts and pentaerythrityl-tetrakis-[3-(3,5-di-t-butyl-4-hydroxyphenyl)propionate as an oxidation inhibitor at 0.3 parts, all parts by mass, was treated by a Henschel mixer for preliminary mixing. The resulting mixture was charged by a feeder to a feed port of biaxial extruder with screws rotating in the same direction. Liquid paraffin was charged as a side feed to a quantity of 60 parts by mass per 100 parts by mass of the total mixture discharged from the extruder where it was molten and kneaded. The melting and kneading conditions were set temperature: 200° C., screw rotating speed: 180 rpm and mixture discharge rate: 12 kg/hour. Then, the molten and kneaded mixture was extruded through T-dies into a gap between the cooling rolls with surfaces controlled at 25° C., to prepare a 1500 μm thick sheet of the polyolefin composition. It was continuously charged to a simultaneous biaxial tenter where it was treated by simultaneous biaxial stretching at a magnification of 7 times in each of the MD and TD directions. The tenter was set at 125° C. It was charged to a methylethylketone tank, where it was sufficiently dipped in methylethylketone to remove liquid paraffin by extraction. Then, methylethylketone was removed by evaporation. The treated sheet was charged to a lateral tenter, where it was stretched at a magnification of 1.3 times in the TD direction. It was continuously treated for thermal fixation and then wound. The lateral tenter was set at 131° C. for the stretching section and 136° C. for the thermal fixation section. The film-making conditions and film characteristics are given in Table 1.

Example 11

A microporous film was prepared in the same manner as in EXAMPLE 10, except that thickness of the polyolefin composition sheet was set at 800 μm and the simultaneous biaxial tenter 1 was set at 122° C., replacing the corresponding conditions. The film-making conditions and film characteristics are given in Table 1.

Comparative Example 1

A composition containing a high-density polyethylene (Mv: 270,000) at 15 parts, alumina (plasticizer oil absorption: 130 mL/100 g) at 30 parts, liquid paraffin (LP) as a plasticizer at 55 parts and pentaerythrityl-tetrakis-[3-(3,5-di-t-butyl-4-hydroxyphenyl)propionate as an oxidation inhibitor at 0.3 parts, all parts by mass, was treated under heating by a plastomill (Toyo Seiki) for mixing under conditions of plastomill temperature: 200° C., rotation speed: 50 rpm and 10 minutes. The molten mixture was taken out of the plastomill and cooled. The resulting solid was placed between metallic plates via polyimide films, compressed at 10 MPa by a hot press set at 200° C. to form a 100 μm thick sheet. The sheet was treated by a biaxial stretching machine (Iwamoto Seisakusho) at 130° C. and at a magnification of 2 times in the MD direction and then at 2 times consecutively in the TD direction. It was dipped in methylene chloride to remove the plasticizer while it was held all around by a stainless steel frame, and dried at room temperature to prepare a microporous film. It had a film thickness of 40 μm, porosity of 62%, air permeability of 140 seconds and piercing strength of 2.4 N. It was tested for shut-down temperature at up to 200° C., but failed to attain an impedance of 1000Ω. Its electrolyte solution capability was rated good (marked with 0). The film-making conditions and film characteristics are given in Table 2.

Comparative Example 2

A microporous film was prepared in the same manner as in COMPARATIVE EXAMPLE 1, except that the high-density polyethylene, silica and liquid paraffin were incorporated at 22, 25 and 53 parts by mass, and stretching was carried out monoaxially at 120° C. and at a magnification of 6 times in the MD direction, replacing the corresponding conditions. The film-making conditions and film characteristics are given in Table 2.

Comparative Example 3

A microporous film was prepared in the same manner as in COMPARATIVE EXAMPLE 1, except that thickness of the sheet was set at 1000 μm before stretching and simultaneous biaxial stretching was attempted at 130° C. and at a magnification of 7 times in each of the MD and TD directions, replacing the corresponding conditions. However, the film was broken at a magnification of about 3.2 times in each direction.

Comparative Example 4

A microporous film was prepared in the same manner as in COMPARATIVE EXAMPLE 1, except that the high-density polyethylene, alumina and liquid paraffin were incorporated at 38, 2 and 60 parts by mass, thickness of the sheet was set at 1000 μm before stretching was used, and simultaneous biaxial stretching was carried out at 115° C. and at a magnification of 7 times in each of the MD and TD directions, replacing the corresponding conditions. The film-making conditions and film characteristics are given in Table 2.

Comparative Example 5

A composition containing a high-density polyethylene (Mv: 270,000) at 28 parts, calcium carbonate (plasticizer oil absorption: 60 mL/100 g) at 59 parts, liquid paraffin (LP) as a plasticizer at 2 parts and pentaerythrityl-tetrakis-[3-(3,5-di-t-butyl-4-hydroxyphenyl)propionate as an oxidation inhibitor at 0.3 parts, all parts by mass, was treated under heating by a plastomill (Toyo Seiki) for mixing under conditions of plastomill temperature: 200° C., rotation speed: 50 rpm and 10 minutes. The molten mixture was taken out of the plastomill and cooled. The resulting solid was placed between metallic plates via polyimide films, compressed at 10 MPa by a hot press set at 200° C. to form a 320 μm thick sheet. The sheet was treated by a simultaneous biaxial stretching machine (Iwamoto Seisakusho) at 135° C. and at a magnification of 5.5 in each of the MD and TD directions. It was dipped in methylene chloride to remove the plasticizer while it was held all around by a stainless steel frame, and dried at room temperature to prepare a microporous film. The film-making conditions and film characteristics are given in Table 2.

Comparative Example 6

A composition containing a high-density polyethylene (Mv: 270,000) at 50 parts, liquid paraffin (LP) as a plasticizer at 50 parts and pentaerythrityl-tetrakis-[3-(3,5-di-t-butyl-4-hydroxyphenyl)propionate as an oxidation inhibitor at 0.3 parts, all parts by mass, was treated under heating by a plastomill (Toyo Seiki) for mixing under conditions of plastomill temperature: 200° C., rotation speed: 50 rpm and 10 minutes. The molten mixture was taken out of the plastomill and cooled. The resulting solid was placed between metallic plates via polyimide films, compressed at 10 MPa by a hot press set at 200° C. to form a 1000 μm thick sheet. The sheet was treated by a simultaneous biaxial stretching machine (Iwamoto Seisakusho) at 118° C. and at a magnification of 7 times in each of the MD and TD directions. It was dipped in methylene chloride to remove the plasticizer while it was held all around by a stainless steel frame, and dried at room temperature to prepare a microporous film. The film-making conditions and film characteristics are given in Table 2.

Comparative Example 7

A microporous film was prepared in the same manner as in COMPARATIVE EXAMPLE 2, except that the high-density polyethylene having an Mv of 270,000 was replaced by a high-density polyethylene having an Mv of 2,000,000. The film-making conditions and film characteristics are given in Table 2.

Comparative Example 8

A microporous film was prepared in the same manner as in COMPARATIVE EXAMPLE 4, except that the high-density polyethylene was incorporated at 33 parts by mass, and 2 parts by mass of alumina was replaced by 7 parts by mass of silica (plasticizer oil absorption: 200 mL/100 g). The film-making conditions and film characteristics are given in Table 2.

The silica and alumina used in EXAMPLES and COMPARATIVE EXAMPLES were prepared by a vapor-phase process, and the calcium carbonate by a liquid-phase process.

TABLE 1

|  |  |  | Example 1 | Example 2 | Example 3 | Example 4 | Example 5 | Example 6 |
|---|---|---|---|---|---|---|---|---|
| Polyolefin | Mv | — | 270,000 | 270,000 | 270,000 | 270,000 | 270,000 | 270,000 |
| Inorganic particles | Type | — | Silica | Silica | Silica | Silica | Alumina | Silica |
|  | Oil absorption | ml/100 g | 200 | 200 | 200 | 230 | 180 | 200 |
| Plasticizer | Type | — | LP | LP | LP | DOP | LP | LP |
|  | Additive amount | wt % | 50 | 50 | 50 | 50 | 60 | 50 |
| Kneaded composition value *1 |  | — | 0.9 | 0.9 | 0.9 | 0.7 | 0.8 | 0.9 |
| Stretching | Stretching method | — | Simultaneous biaxial | Simultaneous biaxial | Simultaneous biaxial | Simultaneous biaxial | Simultaneous biaxial | Simultaneous biaxial |
|  | Magnification in the MD direction | times | 7 | 7 | 5.5 | 7 | 7 | 7 |
|  | Magnification in the TD direction | times | 7 | 7 | 5.5 | 7 | 7 | 7 |
|  | Surface magnification | times | 49 | 49 | 30.25 | 49 | 49 | 49 |
| Microporous film characteristics | Film thickness | μm | 20 | 20 | 21 | 21 | 20 | 19 |
|  | Porosity | % | 50 | 48 | 47 | 50 | 49 | 54 |
|  | Air permeability | sec./100 cc | 200 | 260 | 340 | 180 | 260 | 110 |
|  | Piercing strength | N | 5.0 | 5.4 | 4.0 | 5.1 | 4.3 | 4.6 |
|  |  | N/20μ | 5.0 | 5.4 | 3.8 | 4.9 | 4.3 | 4.8 |
|  | Mv | — | 260,000 | 260,000 | 260,000 | 260,000 | 260,000 | 250,000 |
|  | Inorganic particle content | wt % | 40 | 25 | 25 | 25 | 40 | 40 |
|  | Electrolyte solution impregnating capability | ○ or x | ○ | ○ | ○ | ○ | ○ | ○ |
|  | Shut-down temperature | °C. | 139 | 135 | 134 | 135 | 139 | 139 |
|  | Short-circuiting temperature | °C. | 200< | 200< | 200< | 200< | 200< | 200< |

|  |  |  | Example 7 | Example 8 | Example 9 | Example 10 | Example 11 |
|---|---|---|---|---|---|---|---|
| Polyolefin | Mv | — | 270,000 | 2,000,000/120,000 | 2,000,000/120,000 | 2,000,000/270,000 | 2,000,000/270,000 |
| Inorganic particles | Type | — | Silica | Silica | Alumina | Silica | Silica |
|  | Oil absorption | ml/100 g | 200 | 200 | 180 | 200 | 200 |
| Plasticizer | Type | — | LP | LP | LP | LP | LP |
|  | Additive amount | wt % | 50 | 50 | 60 | 60 | 60 |
| Kneaded composition value *1 |  | — | 0.9 | 0.9 | 0.8 | 0.9 | 0.9 |
| Stretching | Stretching method | — | Simultaneous biaxial | Simultaneous biaxial | Simultaneous biaxial | Simultaneous biaxial | Simultaneous biaxial |
|  | Magnification in the MD direction | times | 7 | 7 | 7 | 7 | 7 |
|  | Magnification in the TD direction | times | 7 | 7 | 7 | 7 | 7 |
|  | Surface magnification | times | 49 | 49 | 49 | 49 | 49 |
| Microporous film characteristics | Film thickness | μm | 10 | 20 | 20 | 19 | 10 |
|  | Porosity | % | 47 | 49 | 48 | 55 | 49 |
|  | Air permeability | sec./100 cc | 90 | 250 | 260 | 160 | 100 |
|  | Piercing strength | N | 2.9 | 6.0 | 5.2 | 5.7 | 3.8 |
|  |  | N/20μ | 5.8 | 6.0 | 5.2 | 6.0 | 7.6 |
|  | Mv | — | 250,000 | 640,000 | 640,000 | 860,000 | 860,000 |
|  | Inorganic particle content | wt % | 40 | 40 | 40 | 25 | 25 |
|  | Electrolyte solution impregnating capability | ○ or x | ○ | ○ | ○ | ○ | ○ |
|  | Shut-down temperature | °C. | 138 | 132 | 132 | 144 | 143 |
|  | Short-circuiting temperature | °C. | 200< | 200< | 200< | 200< | 200< |

*1 Kneaded composition value: Calculated by the relationship a weight of plasticizer/(plasticizer oil absorption × a weight of inorganic particles × plasticizer density) × 100 when the kneading is started.
Plasticizer density d: 0.868 g/cm³ for liquid paraffin and 0.986 g/cm³ for dioctyl phthalate

TABLE 2

|  |  |  | Comparative Example 1 | Comparative Example 2 | Comparative Example 3 | Comparative Example 4 | Comparative Example 5 | Comparative Example 6 |
|---|---|---|---|---|---|---|---|---|
| Polyolefin | Mv |  | 270,000 | 270,000 | 270,000 | 270,000 | 270,000 | 270,000 |
| Inorganic particles | Type | — | Alumina | Alumina | Alumina | Alumina | Calcium carbonate | — |
|  | Oil absorption | ml/100 g | 130 | 130 | 130 | 130 | 60 | — |
| Plasticizer | Type | — | LP | LP | LP | LP | LP | LP |
|  | Additive amount | wt % | 55 | 53 | 55 | 60 | 2 | 50 |
| Kneaded composition value *1 |  | — | 1.6 | 1.9 | 1.6 | 26.6 | 0.1 | — |
| Stretching | Stretching method | — | Consecutive biaxial | Monoaxial | Simultaneous biaxial | Simultaneous biaxial | Simultaneous biaxial | Simultaneous biaxial |
|  | Magnification in the MD direction | times | 2 | 6 | The film was broken during the stretching step | 7 | 5.5 | 7 |
|  | Magnification in the TD direction | times | 2 | — |  | 7 | 5.5 | 7 |
|  | Surface magnification | times | 4 | 6 |  | 49 | 30.25 | 49 |
| Microporous film characteristics | Film thickness | μm | 40 | 40 | — | 20 | 30 | 23 |
|  | Porosity | % | 62 | 70 | — | 47 | 68 | 43 |
|  | Air permeability | sec./100 cc | 140 | 110 | — | 360 | 250 | 440 |
|  | Piercing strength | N | 2.4 | 2.1 | — | 5.1 | 1.8 | 6.3 |
|  |  | N/20μ | 1.2 | 1.1 | — | 5.1 | 1.2 | 5.5 |
|  | Mv | — | 260,000 | 260,000 | 260,000 | 260,000 | 260,000 | 250,000 |
|  | Inorganic particle content | wt % | 67 | 53 | 67 | 5 | 60 | — |
|  | Electrolyte solution impregnating capability | ○ or x | ○ | ○ | — | x | x | x |
|  | Shut-down temperature | ° C. | not observed | 166 | — | 135 | not observed | 135 |
|  | Short-circuiting temperature | ° C. | — | — | — | 164 | — | 152 |

|  |  |  | Comparative Example 7 | Comparative Example 8 |
|---|---|---|---|---|
| Polyolefin | Mv |  | 2,000,000 | 270,000 |
| Inorganic particles | Type | — | Alumina | Silica |
|  | Oil absorption | ml/100 g | 130 | 200 |
| Plasticizer | Type | — | LP | LP |
|  | Additive amount | wt % | 53 | 60 |
| Kneaded composition value *1 |  | — | 1.9 | 4.9 |
| Stretching | Stretching method | — | Monoaxial | Simultaneous biaxial |
|  | Magnification in the MD direction | times | 6 | 7 |
|  | Magnification in the TD direction | times | — | 7 |
|  | Surface magnification | times | 6 | 49 |
| Microporous film characteristics | Film thickness | μm | 40 | 20 |
|  | Porosity | % | 72 | 49 |
|  | Air permeability | sec./100 cc | 100 | 220 |
|  | Piercing strength | N | 2.7 | 4.4 |
|  |  | N/20μ | 1.4 | 4.4 |
|  | Mv | — | 1,800,000 | 260,000 |
|  | Inorganic particle content | wt % | 53 | 18 |
|  | Electrolyte solution impregnating capability | ○ or x | ○ | x |
|  | Shut-down temperature | ° C. | not observed | 136 |

TABLE 2-continued

| | | | |
|---|---|---|---|
| Short-circuiting temperature | ° C. | — | 170 |

*1 Kneaded composition value: Calculated by the relationship a weight of plasticizer/(plasticizer oil absorption × a weight of inorganic particles × plasticizer density) × 100 when the kneading is started.
Plasticizer density d: 0.868 g/cm³ for liquid paraffin and 0.986 g/cm³ for dioctyl phthalate The results given in Tables 1 and 2 clearly indicate that the microporous film of the present invention is a thin film of high piercing strength, good in electrolyte solution impregnating capability, excellent in shut-down capability and resistance to short-circuiting, suitable for separators or the like for storage batteries, e.g., secondary cells of non-aqueous electrolyte solution, electric double-layer capacitors and so forth and also excellent in industrial productivity.

INDUSTRIAL APPLICABILITY

The microporous film of the present invention is suitably applicable to separators of high safety and reliability or the like for storage batteries, e.g., secondary cells of non-aqueous electrolyte solution, electric double-layer capacitors and so forth, and components for fuel cells, humidification films, filtration films and so forth.

The invention claimed is:

1. A microporous film produced by melting and kneading a resin consisting of one or more polyolefin resins, inorganic particles having a plasticizer oil absorption of 150 mL/100 g or more and 500 mL/100 g or less, and a plasticizer and forming a resulting mixture into a sheet shape, then biaxially stretching the sheet at a surface magnification of 20 times or more but less than 100 times, and extracting the plasticizer from the sheet, wherein the content of the inorganic particles in the microporous film is 20% by mass or more and 60% by mass or less, and the piercing strength of the microporous film is 3.0 N/20 μm or more and 10.0 N/20 μm or less; wherein the microporous film has an air permeability of 10 to 1000 seconds; wherein thirty seconds after an electrolyte solution is dropped onto the microporous film in a globe box, 80% or more of the surface of the microporous film in contact with droplets of the solution is transparent, and wherein the electrolyte solution is a 1 mol/L solution of tetraethyl ammonium tetrafluoroborate (solvent: propylene carbonate).

2. The microporous film according to claim 1 which is produced by the step of kneading the polyolefin resin, the inorganic particles and the plasticizer in a composition range which satisfies the following relationship: 0.6≤a weight of plasticizer/(plasticizer oil absorption×a weight of inorganic particles×plasticizer density)×100≤1.2.

3. The microporous film according to claim 1, wherein the polyolefin resin has a viscosity-average molecular weight of 50,000 or more but less than 2,000,000.

4. The microporous film according to claim 1, wherein the polyolefin resin has a viscosity-average molecular weight of 50,000 or more but less than 1,000,000.

5. The microporous film according to claim 4, which has a shut-down temperature of 150° C. or lower.

6. A separator for a storage battery comprising the microporous film according to claim 1.

7. A separator for a storage battery comprising the microporous film according to claim 5.

8. The microporous film according to claim 1, wherein the film has a thickness of 2 to 40 μm.

9. The microporous film according to claim 8, wherein the film has a porosity of 25 to 70%.

* * * * *